United States Patent
Okishima

[19]
[11] Patent Number: 5,809,513
[45] Date of Patent: Sep. 15, 1998

[54] TEXT EDITING METHOD AND TEXT EDITING PROCESSOR

[75] Inventor: Haruhiro Okishima, Kawasaki, Japan

[73] Assignee: Fujitsu Limited, Kawasaki, Japan

[21] Appl. No.: 16,972

[22] Filed: Feb. 12, 1993

[30] Foreign Application Priority Data

Feb. 20, 1992 [JP] Japan .................................. 4-033569

[51] Int. Cl.⁶ .................................................. G06F 17/24
[52] U.S. Cl. .......................................... 707/530; 707/531
[58] Field of Search ............................. 364/419; 395/146, 395/145, 144, 792, 793, 619, 772, 765, 326, 779; 707/530, 531

[56] References Cited

U.S. PATENT DOCUMENTS

| | | | |
|---|---|---|---|
| 3,980,994 | 9/1976 | Ying et al. | 340/172.5 |
| 5,151,857 | 9/1992 | Matsui | 364/419 |
| 5,243,519 | 9/1993 | Andrews et al. | 364/419 |

FOREIGN PATENT DOCUMENTS 63-244135 10/1988 Japan.
1-310439 12/1989 Japan.

OTHER PUBLICATIONS

Webster & Associates "WordPerfect 5.1 for Windows" 1992 pp. 1, 166–167, 281–282.

*Primary Examiner*—Robert A. Weinhardt
*Assistant Examiner*—Frantzy Poinvil
*Attorney, Agent, or Firm*—Staas & Halsey

[57] ABSTRACT

A text editing method updates one or a plurality of historical files which store text data by historical data of edited results. The text editing method includes the steps of (a) developing, at a start of an editing, text data of a specified historical level in a text file format based on a specified historical file, (b) recording, at a time of text editing, historical information indicating correction contents of corrected text data for each record or each line of the text, and (c) extracting, at an end of the editing, the record or text in which the historical information is set, and reflecting the extracted record or text in the historical file.

16 Claims, 10 Drawing Sheets

TEXT EDITING METHOD AND TEXT EDITING PROCESSOR

BACKGROUND OF THE INVENTION

The present invention generally relates to text editing methods and text editing processors, and more particularly to a text editing method which stores texts such as source programs in historical files and updates the historical files, and to a text editing processor which employs such a text editing method.

Texts are often managed by historical files which are made up of correction information for each historical level, so that generation management of source programs and the like can be made efficiently using a relatively small storage region. When updating such a historical file, it takes more time than updating a file which stores the text data in a text format. Accordingly, there are demands to update the historical file at a high speed.

A description will be given of an example of a conventional text editing method, by referring to FIG. 1.

In FIG. 1 Part (A), a historical file 41 which manages the text data as historical data is made up of initial data before the correction and historical data related to correction contents which are accumulated for each correction. For example, if the updating is made up to n levels, the correction of the first level is made with respect to the initial data, the correction of the second level is then made with respect to the result of the editing of the first level, . . . , and the correction of the nth level is made with respect to the result of the editing of the (n−1)th level, in order to restore the newest text file. In other words, when restoring the newest text file, the corrections of the first through nth levels are successively made, starting from the initial data. The updating of the historical file 41 is made in the following manner.

[1] At the start of the editing session, the historical file 41 which is to be edited is specified.

[2] A text editor 40 reads the specified historical file 41 when a text editing request is received, and develops the text. The developed text is copied into two text files 42 and 43.

[3] The text file 43 is edited in the text editor 40, and the result of the editing is stored in the text file 43.

[4] If the end of the editing session occurs, the text editor 40 reads the text file 42 before the editing session and the text file 43 after the editing session, and compares the texts one record (or one line of the text) at a time. The parts which differ are extracted as historical data.

[5] The text editor 40 reflects the extracted historical data in the historical file 41 as the correction data of the (n+1)th level.

For example, with respect to the contents of the text file 42 before the change shown in FIG. 1 Part (B), it will be assumed for the sake of convenience that the updating of the first record and the insertion of a record into the third record are made and that the result of the change becomes the contents the text file 43 after the change. When reflecting the result of the change into the historical file 41, the text file 42 before the change and the text file 43 after the change are compared one record (or one line of the text) at a time, so as to form a historical data 44 shown in FIG. 1 Part (B). In FIG. 1 Part (B), "D" indicates deleted information and "I" indicates inserted information. The historical data 44 indicates the updated records, the inserted records and the deleted records. In this particular example, the updating is recorded by two records, namely, "deletion" and "insertion".

The historical data 44 is stored in the historical file 41 shown in FIG. 1 Part (A).

When storing the contents which are updated by the text editor 40 into the historical file 41, it is necessary to reflect only the edited historical data in the historical file 41. And when extracting this historical data according to the conventional text editing method shown in FIG. 1, the two files 42 and 43 respectively before and after the change are compared in order to extract the historical data 44. As a result, there are problems in that it takes a long processing time to store the historical data and that a large storage region is required for the files.

In other words, after the editing starts, the text restoration is made for the specified historical file up to the specified level, and the restored contents are copied into two text files. For this reason, a large storage capacity of the storage medium such as the disk is used up by the restored contents. In addition, because the contents before and after the change are compared one record (or one line of the text) at a time, it takes a long time to complete the storage into the historical file at the end of the editing.

SUMMARY OF THE INVENTION

Accordingly, it is a general object of the present invention to provide novel and useful text editing method and text editing processor, in which the problems described above are eliminated.

Another and more specific object of the present invention is to provide a text editing method for updating one or a plurality of historical files which store text data by historical data of edited results, comprising the steps of (a) developing, at a start of an editing session, text data of a specified historical level in a text file format based on a specified historical file, (b) recording, at a time of text editing, historical information indicating correction contents of corrected text data for each record or each line of the text, and (c) extracting, at an end of the editing session, the record or text in which the historical information is set, and reflecting the extracted record or text in the historical file. According to the text editing method of the present invention, it is possible to reduce the processing time which is required to complete the storage to the historical file because there is no need to compare the contents of the text file before the editing session with the contents of the text file after the editing session when making the historical data after the editing session ends. In addition, since there is no need to store the text file before the editing session until the editing session ends, it is possible to considerably reduce the storage capacity which is required at the time of the editing session.

Still another object of the present invention is to provide a text editing processor comprising one or a plurality of historical files which store text data by historical data of edited results, first part for developing the text data of a specified historical level in a text file format based on a specified historical file in response to an editing request which requests editing of the text data, second part, coupled to the historical files, for recording, at a time of correcting the text data, historical information indicating correction contents of corrected text data for each record or each line of the text, and third part, coupled to the historical files, for extracting only the record or text in which the historical information is set by the second part, and reflecting the extracted record or text in the historical file. According to the text editing processor of the present invention, it is possible to reduce the processing time which is required to complete the storage to the historical file because there is no need to compare the contents of the text file before the editing with the contents of the text file after the editing when making the historical data after the editing ends. In addition, since there is no need to store the text file before the editing until the editing ends, it is possible to considerably reduce the storage capacity which is required at the time of the editing.

Other objects and further features of the present invention will be apparent from the following detailed description when read in conjunction with the accompanying drawings.

BRIEF DESCRIPTION OF THE DRAWINGS

FIG. 10, a composite of parts (A), (B) and (C), is a diagram for explaining historical information.

DESCRIPTION OF THE PREFERRED EMBODIMENTS

First, a description will be given of the operating principle of the present invention, by referring to FIG. 2.

Figure 1:
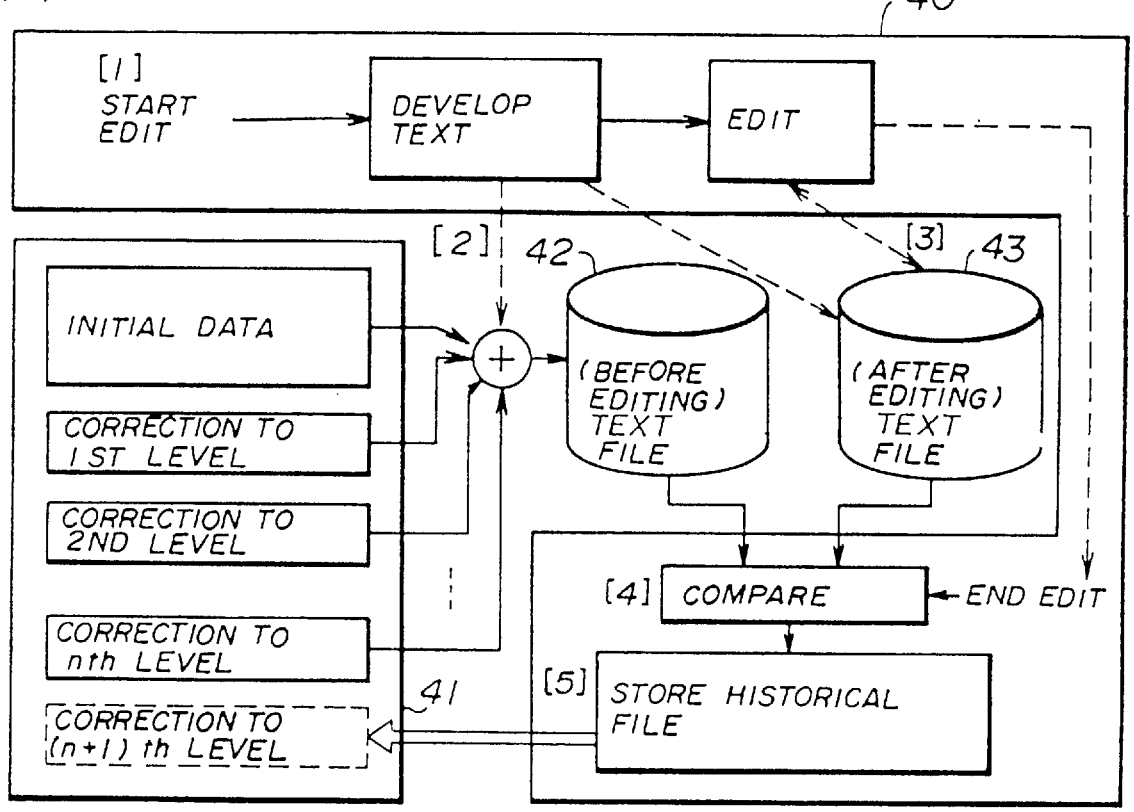
FIG. 1, a composite of parts (A) and (B), is a diagram for explaining an example of a conventional text editing method.
Figure 1:
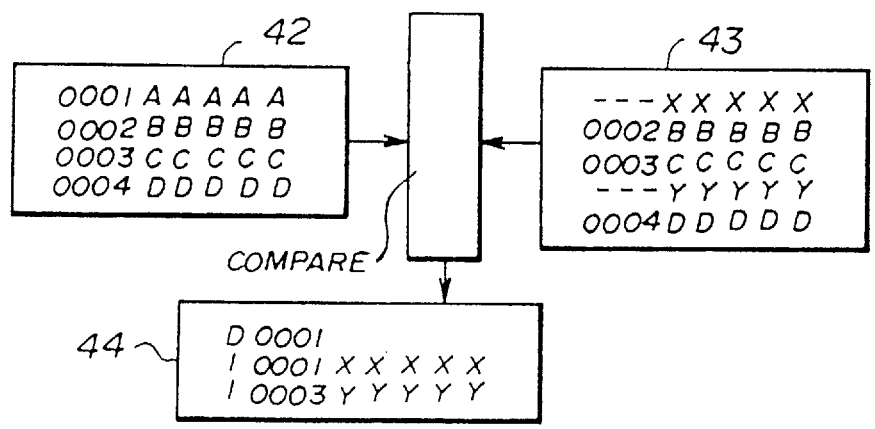
Figure 2:
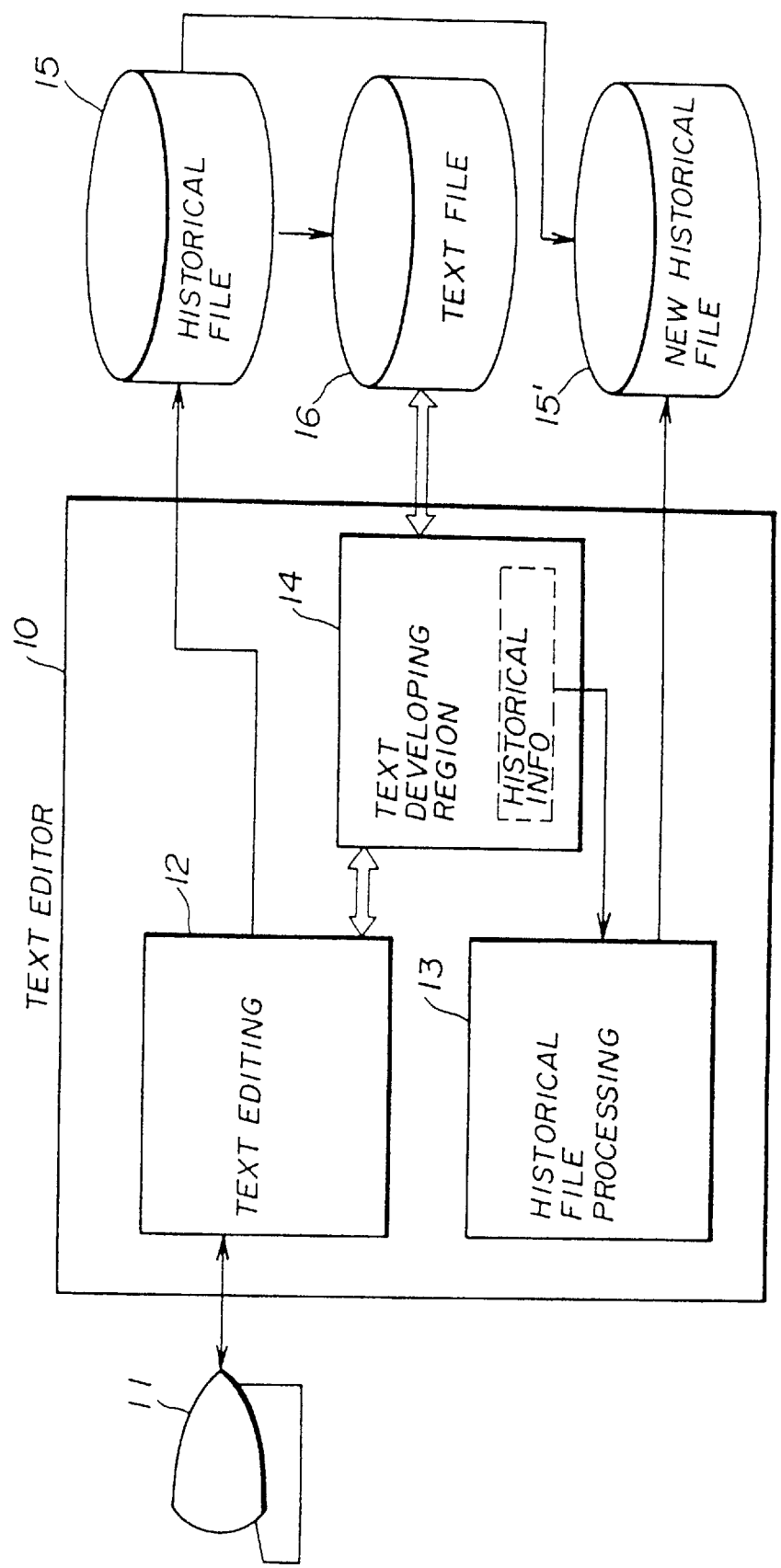
FIG. 2 is a system block diagram for explaining the operating principle of the present invention.

In a text editing processor shown in FIG. 2, a text editor 10 includes a central processing unit (CPU), a memory and the like. This CPU includes a text editing part 12 and a historical file processing part 13, and the memory includes a text developing region (or memory means) 14. The text editor 10 is coupled to an input/output unit 11, historical files 15, new historical files 15', and text files 16.

The historical files 15 store the text data by the historical data of the edited results. The new historical files 15' store the edited results. On the other hand, the text files 16 store the text data which are the subject of the editing and are restored to the specified level based on the historical files 15.

If there is an editing request to edit the text data, the text editing part 12 develops the text data of the specified historical level in the text file format, and edits the text in response to an input from the input/output unit 11. If there exists a corrected text data, historical information indicating the correction contents is recorded in the text developing region 14 of the memory having the same contents as the text files 16 for each record or each line of the text.

When the editing ends, the historical file processing part 13 extracts from the text developing region 14 the record or text in which the historical information is set, and reflects this extracted record or text in the historical files 15 to form the new historical files 15'.

In the present invention, the text editing part 12 records the historical information for each record or each line of the text, and the historical file processing part 13 reflects the record or text in which the historical information is set in the historical files 15. Hence, there is no need to compare the data before the change with the data after the change one record or one line of the text at a time. Consequently, the storage process of the historical files 15 at the end of the editing can be made at a high speed. In addition, since there is no need to prepare as the text files 16 the data before and after the change, the required storage capacity of the storage medium can be reduced considerably.

Figure 3:
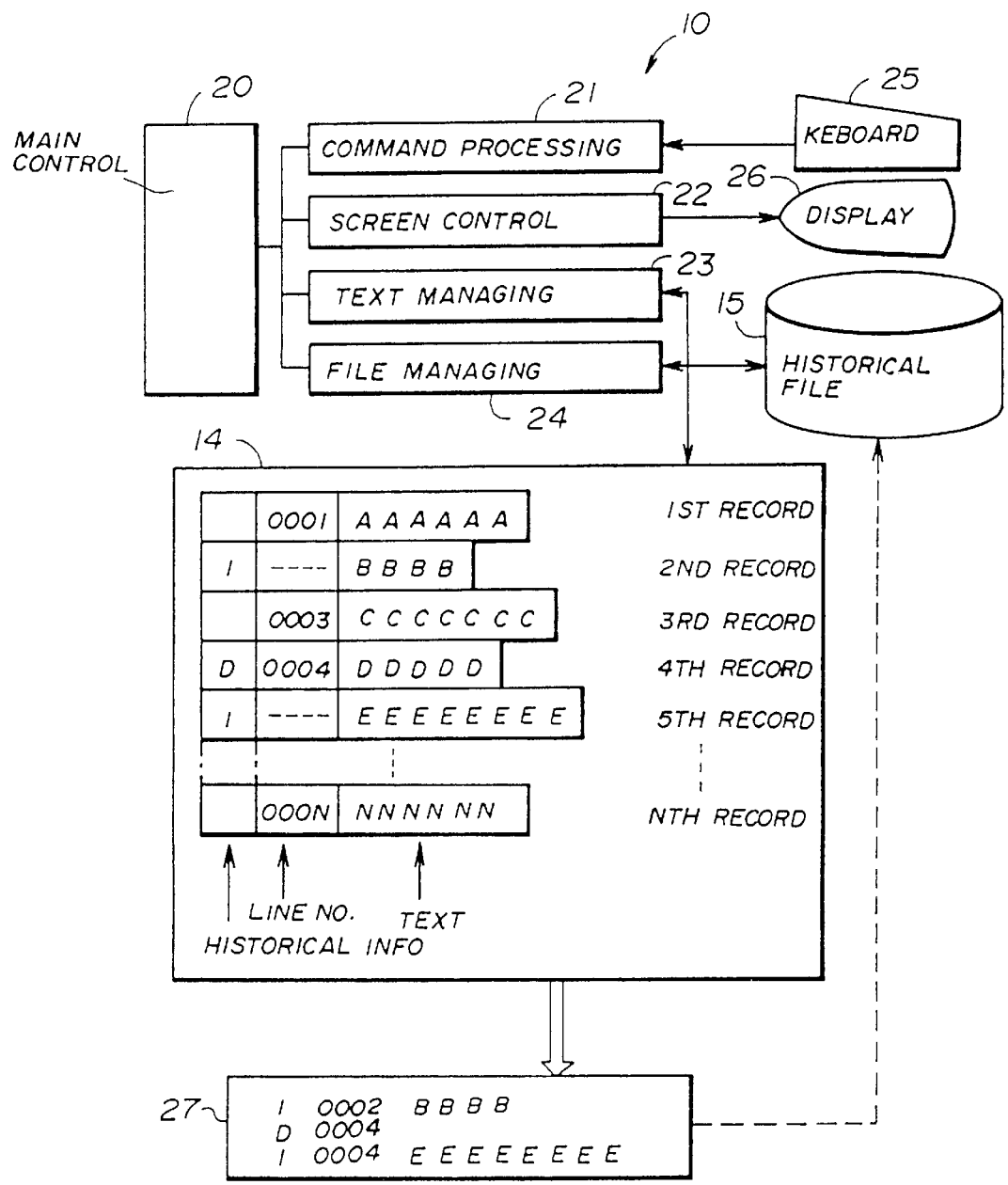
FIG. 3 is a system block diagram for explaining an embodiment of a text editing processor according to the present invention.
Figure 4:
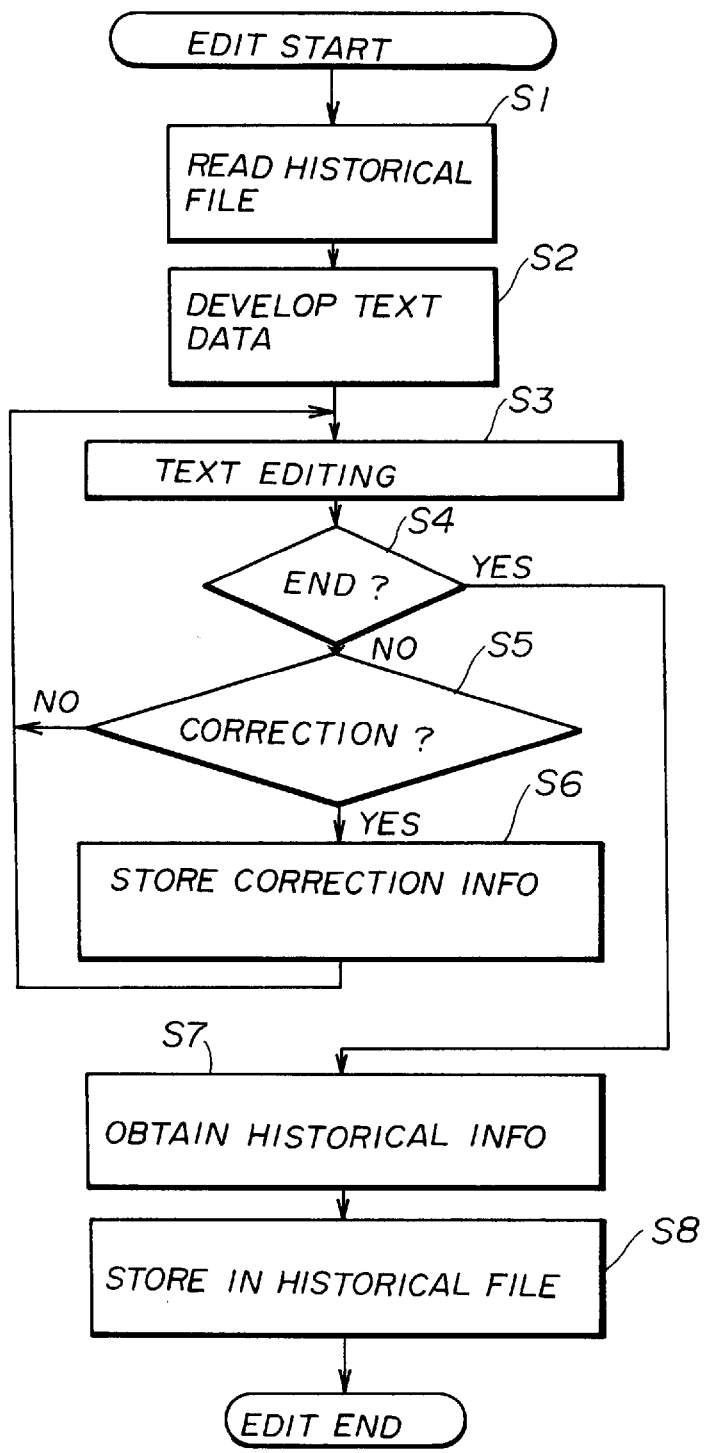
FIG. 4 is a flow chart for explaining the general operation of the embodiment shown in FIG. 3.

Next, a description will be given of an embodiment of a text editing processor according to the present invention, by referring to FIGS. 3 and 4. FIG. 3 shows an essential part of this embodiment, and FIG. 4 is a flow chart for explaining the general operation of this embodiment.

A text editing processor shown in FIG. 3 generally includes a text editor 10, a keyboard 25, a display 26 and historical files 15. The text editor 10 includes a main control part 20, a command processing part 21, a screen control part 22, a text managing part 23, a file managing part 24, and a memory including a text developing region (or memory part) 14. The main control part 20 carries out the control of the entire text editor 10. The command processing part 21 inputs editing commands, editing sub commands and the like from the keyboard 25 or the like. The screen control part 22 controls the display of the text on the display 26. The text managing part 23 manages the text which is the subject of the editing. The file managing part 24 manages the input and output with respect to the files. The text managing part 23 and the file managing part 24 form an essential part of the present invention.

When developing the text in the text developing region 14 of the memory for the purpose of editing the text, the text managing part 23 adds historical information to each record. In this embodiment, the historical information indicates one of "no update (blank)", "insertion (I)" and "deletion (D)". An "update" is recorded by two records "deletion (D)" and "insertion (I)".

The file managing part 24 refers to the historical information of the text developing region 14 when updating the historical files 15, and obtains the records in which "insertion (I)" and "deletion (D)" are set. Hence, a historical data 27 shown in FIG. 3 is obtained, and this historical data 27 is reflected in the historical files 15.

The text developing region 14 shown in FIG. 3 includes first through Nth records. Each record includes a column for indicating the historical information, a column for indicating a line number, and a column for indicating the text.

In FIG. 4, the file managing part 24 reads the historical data from the specified historical file 15 in step S1 when an instruction is received to start the editing session. Then, the text managing part 23 restores the text data up to the specified level or, to the newest level if the level is not specified, in step S2 based on the read historical data. The restored text data is developed in the memory. In addition, the developed text data is written as a text file into the storage medium such as the disk, if necessary.

The command processing part 21 carries out a text editing process in response to an editing sub command in step S3, similarly to the conventional text editor. The command processing part 21 decides whether an instruction to end the editing session has been received in step S4. The process advances to step S7 if the decision result in step S4 is YES, but advances to step S5 if the decision result in step S4 is NO.

The text managing part 23 decides whether a correction has been made in step S5. The process returns to step S3 if the decision result in step S5 is NO. On the other hand, if an updating, insertion or deletion has been made with respect to the record and the decision result in step S5 is YES, the text managing part 23 stores the historical information of the record and the correction information of the text information into the text developing region 14 in step S6. Thereafter, the process returns to step S3, and steps S3 through S6 are repeated until the instruction to end the editing session is received and the decision result in step S4 becomes YES.

The command processing part 21 and the text managing part 23 cooperate, and form the historical data 27 in step S7 by obtaining from the text developing region 14 of the memory the records in which the historical information is stored. Next, the command processing part 21 and the file managing part 24 cooperate, and store the historical data 27 into the historical file 15. The editing process ends after step S8.

Next, a more detailed description will be given of this embodiment, by describing the operations of the main control part 20, the command processing part 21, the screen control part 22, the text managing part 23 and the file managing part 24, by referring to FIGS. 5 through 9.

Figure 5:
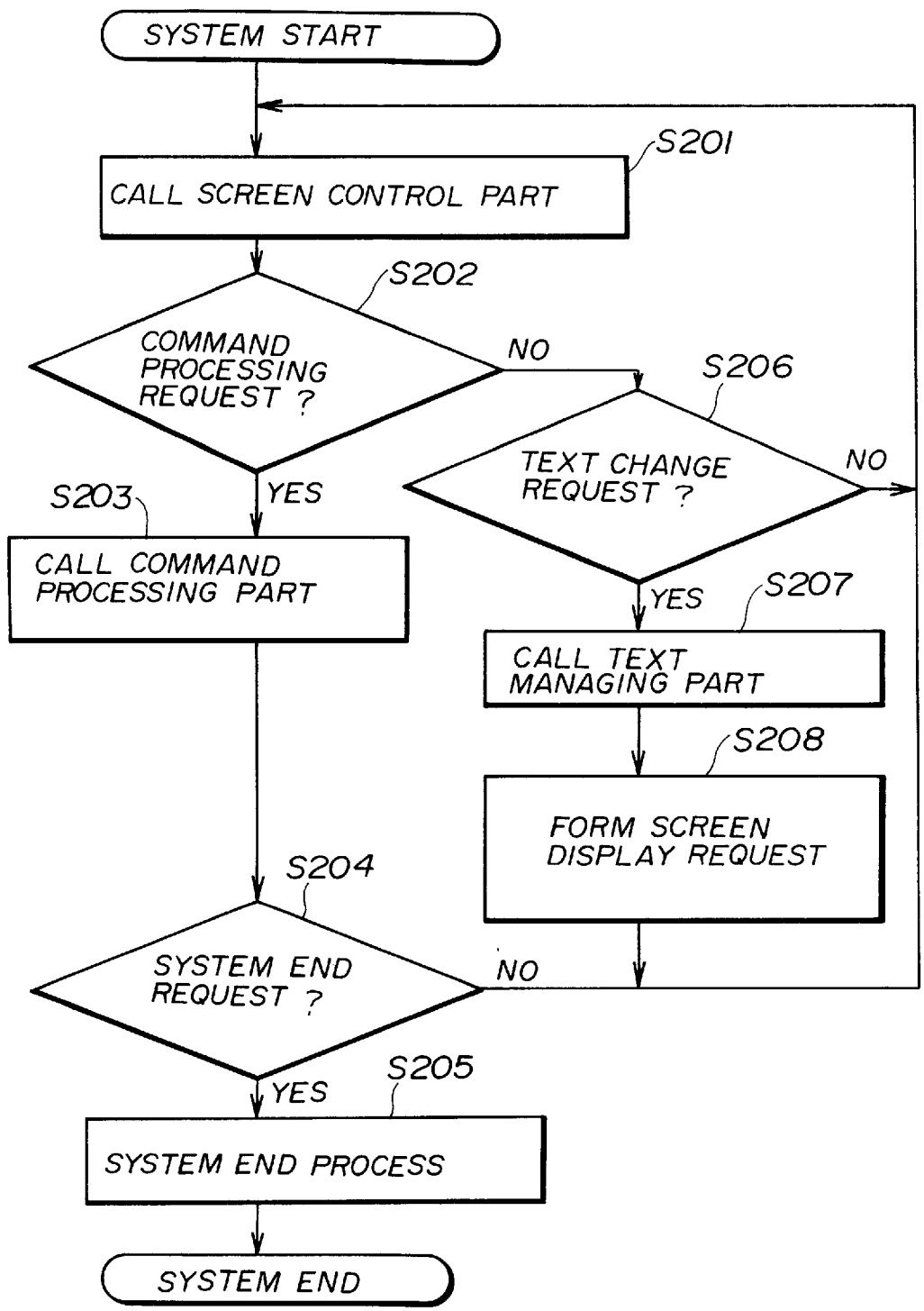
FIG. 5 is a flow chart for explaining the operation of a main control part of a text editor.

FIG. 5 is a flow chart for explaining the operation of the control part 20. In FIG. 5, step S201 calls the screen control part 22, and step S202 decides whether there exists a command processing request. If the decision result in step S202 is YES, step S203 calls the command processing part 21, and step S204 decides whether there exists a system end request. If the decision result in step S204 is YES, step S205 carries out a system end process, and the process ends. The process returns to step S201 if the decision result in step S204 is NO.

On the other hand, if the decision result in step S202 is NO, step S206 decides whether there exists a text changing request. The process returns to step S201 if the decision result in step S206 is NO. But if the decision result in step S206 is YES, step S207 calls the text managing part 23. Thereafter, step S208 forms a screen display request with respect to the screen control part 22 for requesting display of the changed text on the display 26, and the process returns to step S201.

Figure 6:
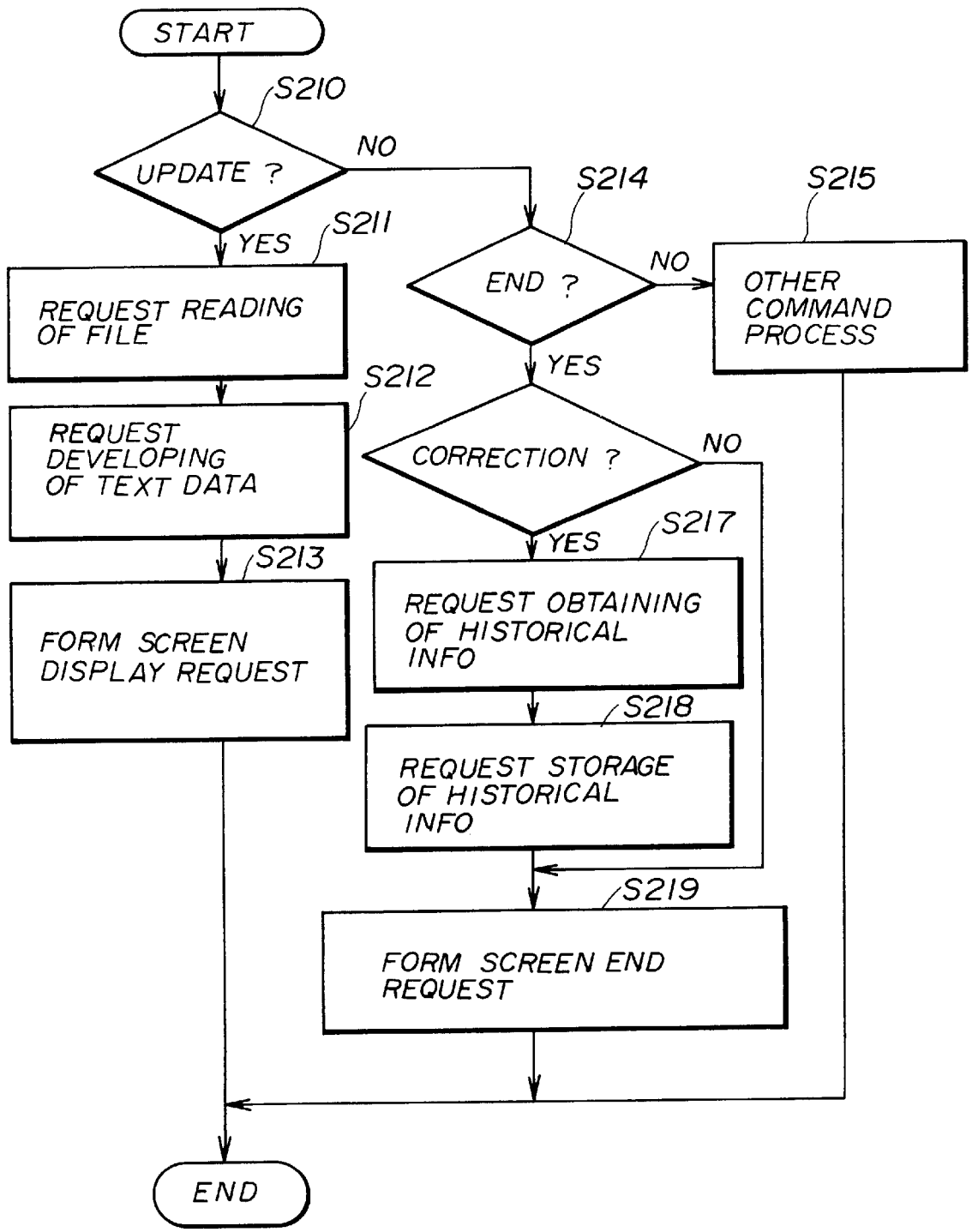
FIG. 6 is a flow chart for explaining the operation of a command processing part of the text editor.

FIG. 6 is a flow chart for explaining the operation of the command processing part 21. In FIG. 6, step S210 decides whether the command processing request is "update". If the decision result in step S210 is YES, step S211 requests the file managing part 24 to read a file. Step S212 requests the text managing part 23 to develop the text data in the memory. In addition, step S213 forms a screen display request with respect to the screen control part 22 for requesting display of the text data developed in the memory on the display 26, and the process ends.

On the other hand, if the decision result in step S210 is NO, step S214 decides whether the command processing request is "end". Step S215 regards that the command process request is related to a command process other than "update" and "end", and the process ends.

But if the decision result in step S214 is YES, step S216 decides whether a change of the text exists. If the decision result in step S216 is YES, step S217 requests the text managing part 23 to obtain the historical information, that is, the changed text data. In addition, step S218 requests the file managing part 24 to store the historical information, that is, changed text data. After the step S218 or if the decision result in step S216 is NO, a step S219 forms a screen end request with respect to the screen control part 22 for requesting the end of the screen display on the display 26, and the process ends.

Figure 7:
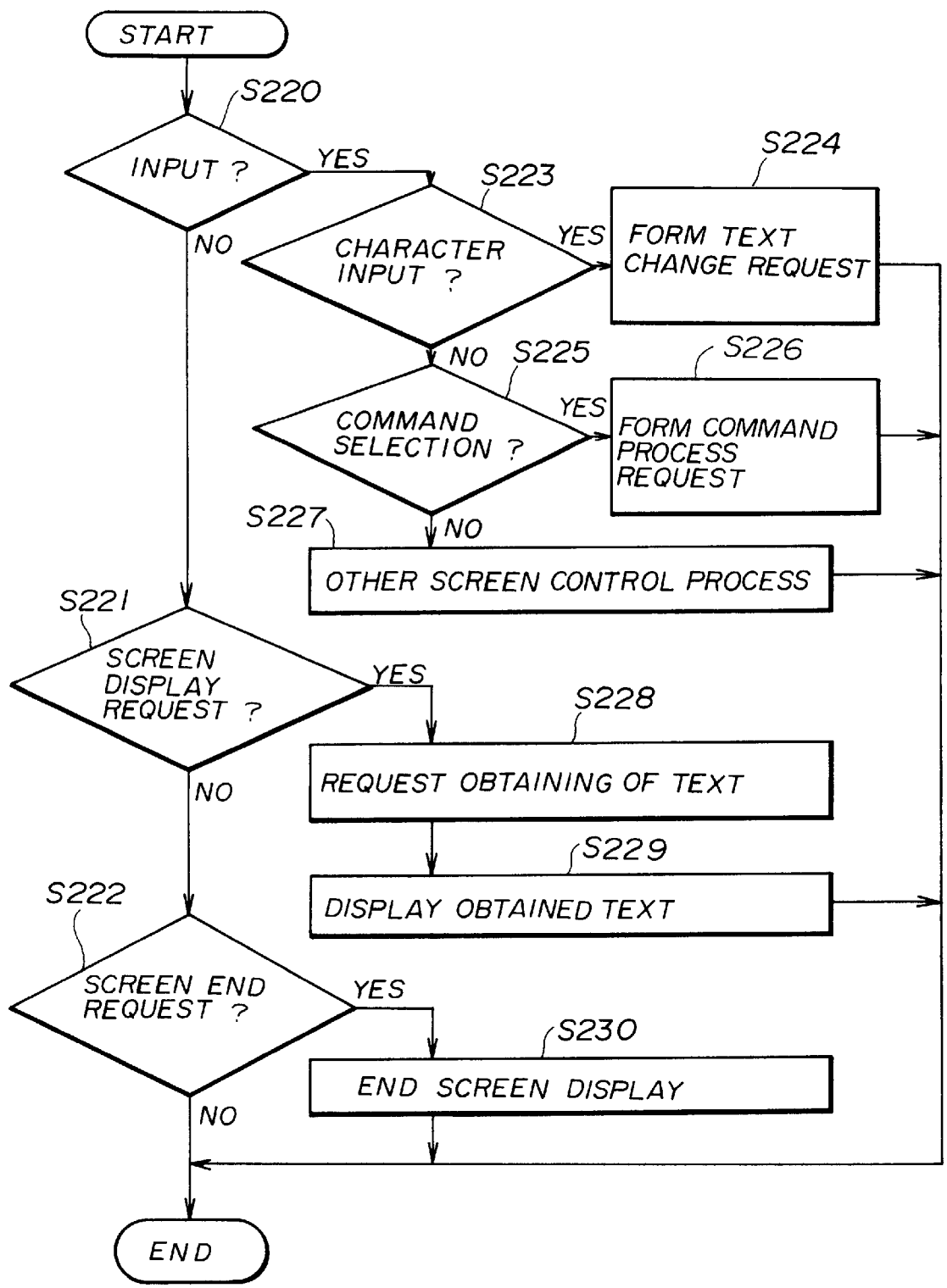
FIG. 7 is a flow chart for explaining the operation of a screen control part of the text editor.

FIG. 7 is a flow chart for explaining the operation of the screen control part 22. In FIG. 7, step S220 decides whether an input exists from the keyboard 25. If the decision result in step S220 is NO, step S221 decides whether a screen display request exists. If the decision result in step S221 is NO, a step S222 decides whether screen end request exists. The process ends if the decision result in step S222 is NO.

On the other hand, if the decision result in step S220 is YES, step S223 decides whether a character input exists in the region of the edited text. If the decision result in step S223 is YES, step S224 forms a text changing request (change, insert, delete) with respect to the text managing part 23 for requesting the change of text. On the other hand, if the decision result in step S223 is NO, step S225 decides whether a selection of the command exists. If the decision result in step S225 is YES, step S226 forms a command processing request (change, end, etc.) with respect to the command processing part 21 for requesting the command processing. But if the decision result in step S225 is NO, step S227 carries out a process related to one of other screen controls. The process ends after step S224, S226 or S227.

Step S228 requests the text managing part 23 to obtain the text if the decision result in step S221 is YES. In addition, step S229 displays the obtained text on the screen of the display 26, and the process ends.

Furthermore, if the decision result in step S222 is YES, step S230 ends the screen display on the display 26, and the process ends.

Figure 8:
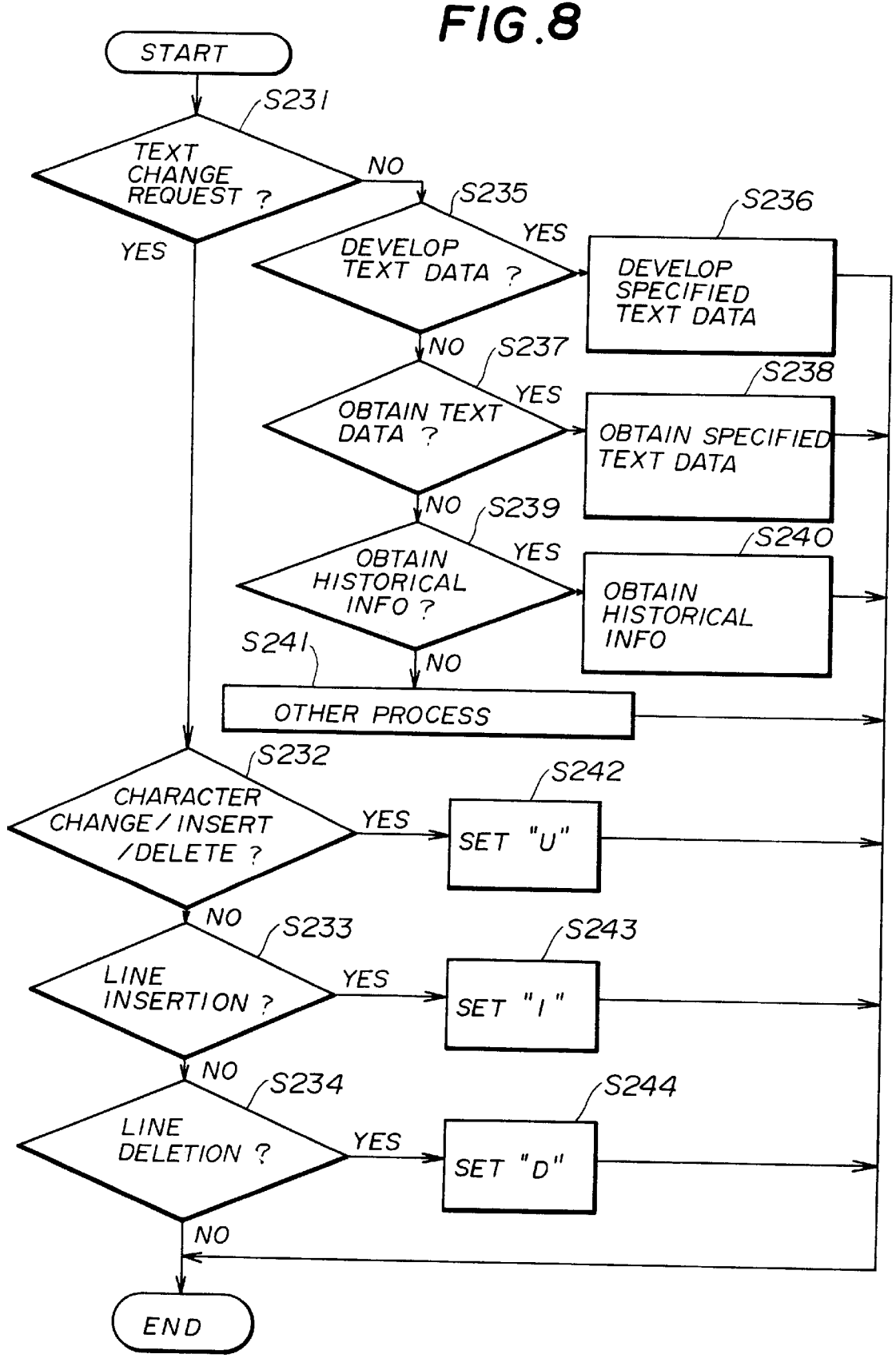
FIG. 8 is a flow chart for explaining the operation of a text managing part of the text editor.

FIG. 8 is a flow chart for explaining the operation of the text managing part 23. In FIG. 8, step S231 decides whether there exists a text changing request. If the decision result in step S231 is YES, step S232 decides whether the text changing request relates to the change, insertion or deletion of the character. Step S233 decides whether the text changing request relates to the insertion of a line if the decision result in step S232 is NO. Further, step S234 decides whether the text changing request relates to the deletion of a line if the decision result in step S233 is NO. The process ends if the decision result in step S234 is NO.

On the other hand, if the decision result in step S231 is NO, step S235 decides whether there exists a request to develop a text data in the memory. Step S236 develops the specified text data in the memory if the decision result in step S235 is YES, and the process ends.

If the decision result in step S235 is NO, step S237 decides whether there exists a request to obtain a text data. Step S238 obtains the specified text data from the memory if the decision result in step S237 is YES, and the process ends.

If the decision result in step S237 is NO, step S239 decides whether there exists a request to obtain historical information. Step S240 obtains the historical information, that is, the changed text data, and the process ends. Step S241 carries out other processes if the decision result in step S239 is NO, and the process ends.

Step S242 stores correction information in the memory and sets "U" as the historical information if the decision result in step S232 is YES, where "U" indicates update. Of course, the update can be described by the two records respectively of "deletion (D)" and "insertion (I)" as shown in FIG. 3. Step S243 stores correction information in the memory and sets "I" as the historical information if the decision result in step S233 is YES, where "I" denotes insertion. In addition, step S244 stores correction information in the memory and sets "D" as the historical information if the decision result in step S234 is YES, where "D" indicates deletion. The process ends after step S242, S243 or S244.

Figure 9:
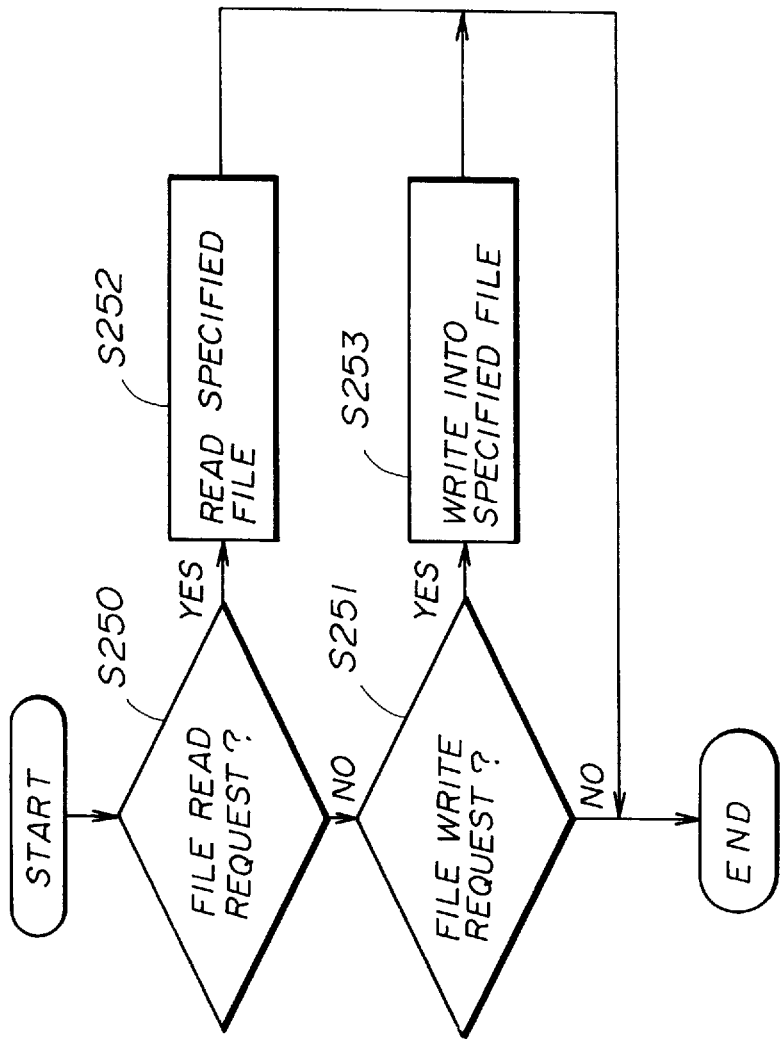
FIG. 9 is a flow chart for explaining the operation of a file managing part of the text editor.

FIG. 9 is a flow chart for explaining the operation of the file managing part 24. In FIG. 9, step S250 decides whether there exists a request to read a file. If the decision result in step S250 is NO, step S251 decides whether there exists a request to write a file. The process ends if the decision result in step S251 is NO.

On the other hand, step S252 reads the specified file if the decision result in step S250 is YES, and the process ends. In addition, step S253 writes the historical information into the specified file if the decision result in step S251 is YES, and the process ends.

Figure 10:
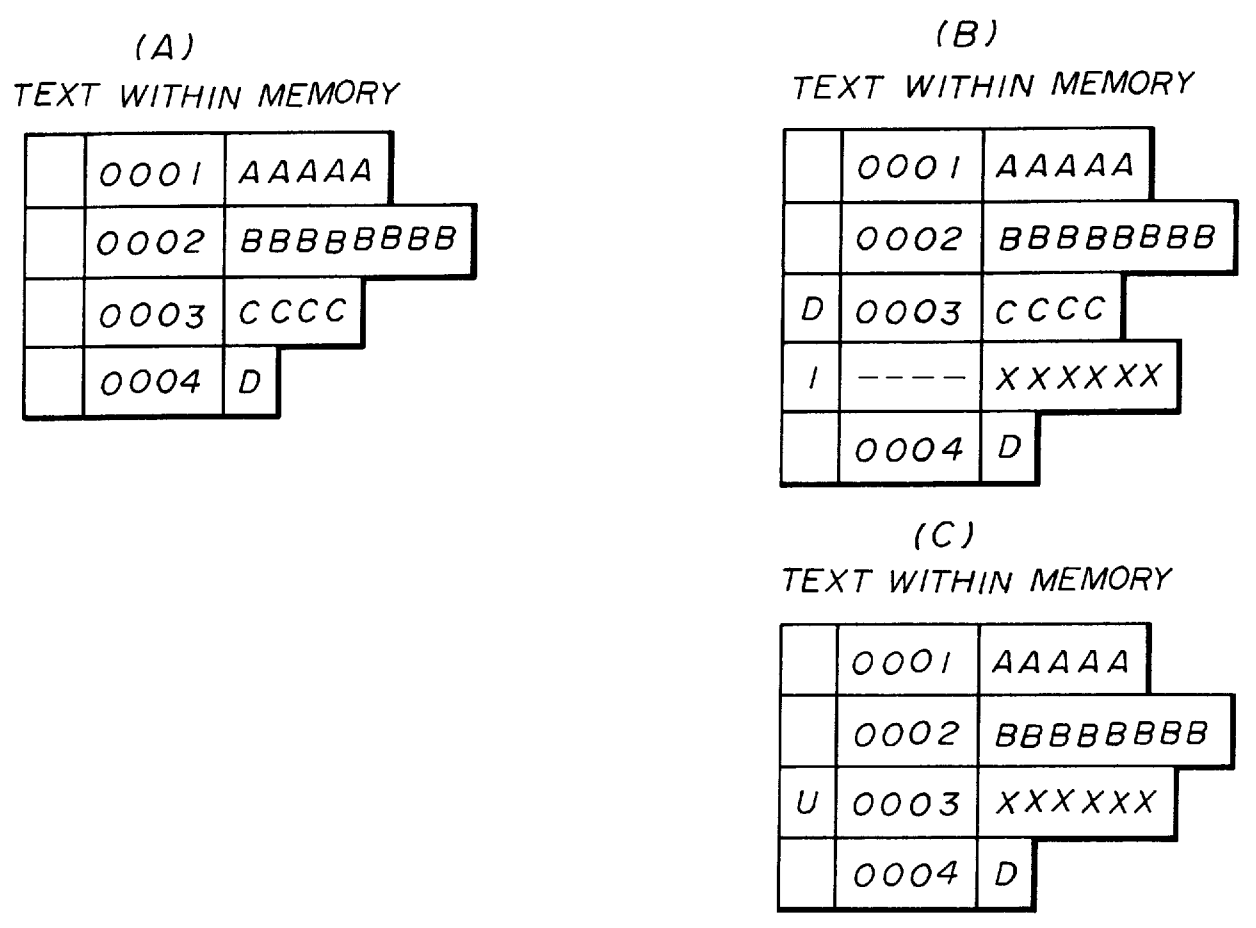

Next, a description will be given of the historical data. In FIG. 3, the update is set by the two records respectively of "deletion (D)" and "insertion (I)". In other words, if the character sequence "CCCC" in FIG. 10 (A) is changed to "XXXXXX", this update is described by the two records respectively of "deletion (D)" and "insertion (I)" as shown in FIG. 10 Part (B).

However, as described with reference to step S242 shown in FIG. 8, the "update (U)" can be provided additionally as the historical data. In this case, if the character sequence "CCCC" in FIG. 10 Part (A) is changed to "XXXXXX", this update is described by the record of "update (U)" as shown in FIG. 10 Part (C). In other words, the "deletion (D)", "insertion (I)" and "update (U)" are described by mutually independent historical information in this case.

Further, the present invention is not limited to these embodiments, but various variations and modifications may be made without departing from the scope of the present invention.

What is claimed is:

1. A text editing method having text files, each text file having a text file format and containing text data in a form of text, and historical files comprising at least a first historical file, each historical file corresponding to a respective one of the text files and storing historical levels comprising at least a first historical level, each historical level corresponding to one of successive editing sessions of the respective one of the text files and comprising historical data, said historical data comprising the text data, said historical data being of edited results of the respective one of the text files, the historical data comprising at least one record, said text editing method updating said historical files during the successive editing sessions, for each editing session said text editing method comprising the steps of:

(a) developing, at a start of the editing session, the text data of the first historical level in the text file format based only on the first historical file and only in the one of the text files being edited;

(b) recording, during the editing session while each record is being updated, historical information indicating correction contents of text data for each record corrected, each record corresponding to each line of the text; and (c) extracting, at an end of the editing session, the record storing the historical information recorded during the recording step, forming an extracted record, and storing the extracted record in a new historical file.

2. The text editing method as claimed in claim 1, wherein the historical information indicates one of insertion of data into one of the text files by a first record, deletion of data from the one of the text files by a second record, and update of data in the one of the text files by a third record and a fourth record, the third record indicating insertion of data, and the fourth record indicating deletion of data.

3. The text editing method as claimed in claim 1, wherein the historical information indicates one of insertion of data into one of the text files by a first record, deletion of data from the one of the text files by a second record, and update of data in the one of the text files by a third record.

4. The text editing method as claimed in claim 1, wherein said step (b) records the historical information for each record corresponding to each line number.

5. The text editing method as claimed in claim 1, further comprising the step of:

(d) restoring the text data to be edited up to the first historical level based on the historical file corresponding to the text file storing the text data.

6. A text editing processor for editing text data, invoked by an editing request, and having text files, each text file having a text file format, said text editing processor comprising:

historical files, each historical file storing historical levels, each historical level corresponding to one of successive editing sessions of a respective one of the text files and comprising historical data comprising the text data of edited results, the historical data comprising at least one record, each historical file comprising at least one historical level, and each historical file corresponding to a respective one of the text files;

first means for developing the text data of a first historical level in the text file format based only on the first historical file in response to the editing request and only in the one of the text files being edited;

second means, coupled to said first means, for storing, at a time of correcting the text data and while each record is being updated, historical information indicating correction contents of text data for each record corrected; and third means, coupled to said second means, for extracting only each record in which the historical information is stored by said second means, and storing the extracted record in a new historical file.

7. The text editing processor as claimed in claim 6, which further comprises memory means, coupled to said first and third means, for providing a text developing region for developing the text data by said first means.

8. The text editing processor as claimed in claim 6, wherein the historical information indicates one of insertion of data into one of the text files by a first record, deletion of data from the one of the text files by a second record, and update of data in the one of the text files by a third record and a fourth record, said third record indicating deletion of data and said fourth record indicating insertion of data.

9. The text editing processor as claimed in claim 6, wherein the historical information indicates one of insertion of data into one of the text files by a first record, deletion of data from the one of the text files by a second record, and update of data in the one of the text files by a third record.

10. The text editing processor as claimed in claim 6, wherein said third means records the historical information for each record in correspondence with each line number.

11. The text editing processor as claimed in claim 6, which further comprises fourth means, coupled to said historical files, for restoring the text data which is to be edited up to one of the at least one historical level based on the historical files.

12. A text editing method for editing text files in successive editing sessions, for each of the successive editing sessions said text editing method comprising the steps of:

(a) reading a text file stored in a first region of a memory and updating the text file based only on one of the historical levels stored in an historical file stored in a second region of the memory, each historical level corresponding to one of the successive editing sessions of the text file and being text data comprising historical data of edited results of the one of the successive editing sessions;

(b) generating an updated text file by updating the text file based on data from an input unit;

(c) updating the historical file by adding a new historical level to the historical file corresponding to step (b), and storing the historical file in the second region of the memory, said new historical level comprising the historical data of edited results of a current editing session, said historical data indicating correction contents of the text data for each record corrected, each record corresponding to each line of the text file, said historical data being recorded during the current editing session while each record is being updated and being stored in the new historical level at an end of the current editing session; and (d) storing the updated text file in the first region of the memory at an end of each successive editing session.

13. A text editing processor for editing text files in successive editing sessions, said text editing processor comprising:

an input unit inputting data;

a memory comprising a first region and a second region, said first region storing text files and said second region storing historical files, each historical file corresponding to one of the text files and comprising historical levels, each historical level corresponding to one of the successive editing sessions of the text file and being text data comprising historical data of edited results of the one of the successive editing sessions; and a processor, coupled to the memory, generating an updated text file by updating the one of the text files based only on data from the input unit and on a corresponding one of the historical files, updating the corresponding one of the historical files by adding a new historical level to the corresponding one of the historical files, storing the corresponding one of the historical files in the second region, and storing the updated text file in the first region at an end of each successive editing session, said new historical level comprising the historical data of edited results of a current editing session, said historical data indicating correction contents of the text data for each record corrected, each record corresponding to each line of the text file, said historical data being recorded during the current editing session while each record is being updated and being stored in the new historical level at an end of the current editing session.

14. A text editing method for text files on a computer, comprising the steps of:

reading one of the text files into a text editor;

updating the one of the text files and recording only the updates made to the one of the text files and while the updates to the one of the text files are being made; and storing the updates in a historical file comprising the updates when the one of the text files is stored.

15. A text editing method as recited in claim 14, wherein the historical file comprises historical levels, each historical level comprising the updates made to a corresponding one of the text files during a corresponding one of editing sessions.

16. A text editing method for text files on a computer, comprising the steps of:

reading one of the text files into a text editor;

updating the one of the text files and recording only the updates made to the one of the text files and while the updates to the one of the text files are being made; and storing the updates in a historical file comprising the updates when the one of the text files is stored, said historical file comprising historical levels, each historical level comprising the updates made to a corresponding one of the text files during a corresponding one of editing sessions, and wherein a new historical level is added to the historical file corresponding to the updates made to the corresponding one of the text files during the corresponding one of the editing sessions, said new historical level comprising historical data of edited results of a current editing session, said historical data indicating correction contents of text data for each record corrected, each record corresponding to each line of the one of the text files, said historical data being recorded during the current editing session while each record is being updated and being stored in the new historical level at an end of the current editing session.

* * * * *

UNITED STATES PATENT AND TRADEMARK OFFICE
CERTIFICATE OF CORRECTION

PATENT NO.: 5,809,513
DATED : September 15, 1998
INVENTOR(S): Haruhiro OKISHIMA

It is certified that error appears in the above-identified patent and that said Letters Patent is hereby corrected as shown below:

On the title page, please insert the following U.S. Patent Documents:

| | | | |
|---|---|---|---|
| 5,169,991 | 04/1997 | Sloane | 128/630 |
| 5,544,359 | 08/1996 | Tada et al. | 395/650 |
| 5,155,850 | 10/1992 | Janis et al. | 395/600 |
| 4,809,170 | 02/1989 | Leblang et al. | 364/200 |
| 4,507,751 | 03/1985 | Gawlick et al. | 364/900 |

Signed and Sealed this

Eighteenth Day of April, 2000

Attest:

Q. TODD DICKINSON

*Attesting Officer*     *Director of Patents and Trademarks*